United States Patent
Igari et al.

(10) Patent No.: US 12,344,245 B2
(45) Date of Patent: Jul. 1, 2025

(54) CONTROLLER AND CONTROL METHOD

(71) Applicant: Robert Bosch GmbH, Stuttgart (DE)

(72) Inventors: Yoshihide Igari, Kanagawa (JP); Yuki Oshida, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 17/916,332

(22) PCT Filed: Mar. 16, 2021

(86) PCT No.: PCT/IB2021/052162
§ 371 (c)(1),
(2) Date: Sep. 30, 2022

(87) PCT Pub. No.: WO2021/198821
PCT Pub. Date: Oct. 7, 2021

(65) Prior Publication Data
US 2023/0147892 A1 May 11, 2023

(30) Foreign Application Priority Data

Mar. 31, 2020 (JP) .................................. 2020-062351

(51) Int. Cl.
*B60W 30/14* (2006.01)
*B60W 30/045* (2012.01)
(Continued)

(52) U.S. Cl.
CPC ........ *B60W 30/143* (2013.01); *B60W 30/045* (2013.01); *B60W 30/09* (2013.01);
(Continued)

(58) Field of Classification Search
CPC .. B60W 30/14; B60W 30/143; B60W 30/146; B60W 30/16; B60W 30/162;
(Continued)

(56) References Cited

U.S. PATENT DOCUMENTS

2015/0314781 A1 11/2015 Klews et al.
2017/0358209 A1* 12/2017 Ohmori ................. B60W 30/08
(Continued)

FOREIGN PATENT DOCUMENTS

DE 102017211886 A1 1/2019
EP 2050642 A2 4/2009
(Continued)

OTHER PUBLICATIONS

Idriz et al., Integration of auto-steering with adaptive cruise control for improved cornering behaviour, 2107, IET Intelligent Transportation Systems (Year: 2017).*
(Continued)

*Primary Examiner* — Peter D Nolan
*Assistant Examiner* — Sara J Lewandroski
(74) *Attorney, Agent, or Firm* — Michael Best & Friedrich LLP (57) ABSTRACT

The present invention obtains a controller and a control method capable of appropriately assisting with driving by a rider. In the controller and the control method according to the present invention, an acquisition section of a controller (60) acquires lateral acceleration information of a traveling straddle-type vehicle (100), and in a control mode in which behavior control operation to make the straddle-type vehicle (100) automatically decelerate or automatically accelerate is performed, an execution section of the controller (60) changes the behavior control operation according to the lateral acceleration information.

13 Claims, 2 Drawing Sheets

(51) Int. Cl.
*B60W 30/09* (2012.01)
*B60W 30/18* (2012.01)
*B60W 50/16* (2020.01)

(52) U.S. Cl.
CPC ...... *B60W 30/18145* (2013.01); *B60W 50/16* (2013.01); *B60W 2300/36* (2013.01); *B60W 2520/125* (2013.01); *B60W 2720/106* (2013.01)

(58) Field of Classification Search
CPC .... B60W 30/165; B60W 30/17; B60W 30/18; B60W 30/18009; B60W 30/18145; B60W 30/18154; B60W 30/18159; B60W 30/18163; B60W 30/18172; B60W 30/182; B60W 30/08; B60W 30/082; B60W 30/085; B60W 30/087; B60W 30/045; B60W 50/14; B60W 50/16; B60W 2050/143; B60W 2050/146; B60W 2300/36; B60W 2300/362; B60W 2300/365; B60W 2300/367; B60W 2520/125
See application file for complete search history.

(56) References Cited

U.S. PATENT DOCUMENTS

| | | | |
|---|---|---|---|
| 2018/0312164 A1* | 11/2018 | Sasabuchi | B60W 30/18018 |
| 2019/0129416 A1* | 5/2019 | Upmanue | G05D 1/0061 |
| 2019/0217868 A1* | 7/2019 | Kim | B60W 50/029 |
| 2020/0047739 A1 | 2/2020 | Grelaud et al. | |

FOREIGN PATENT DOCUMENTS

| | | | | |
|---|---|---|---|---|
| FR | 2975958 A1 * | 12/2012 | | B60K 31/0008 |
| JP | 2009116882 A | 5/2009 | | |

OTHER PUBLICATIONS

International Search Report and Written Opinion for Application No. PCT/IB2021/052162 dated May 26, 2021 (12 pages).

* cited by examiner

CONTROLLER AND CONTROL METHOD

BACKGROUND OF THE INVENTION

The present disclosure relates to a controller and a control method for controlling behavior of a straddle-type vehicle.

As a conventional technique related to a straddle-type vehicle, a technique of assisting with driving by a rider is available.

For example, a system is disclosed in JP-A-2009-116882. Based on information detected by a sensor that detects an obstacle present in a travel direction or substantially in the travel direction, the system warns a rider of the straddle-type vehicle that the straddle-type vehicle inappropriately approaches the obstacle.

SUMMARY OF THE INVENTION

By the way, in order to assist with driving by the rider, it is considered that a controller performs behavior control operation to automatically decelerate or automatically accelerate the straddle-type vehicle. The controller acquires trigger information during travel of the straddle-type vehicle, and according to the trigger information, initiates a control mode in which the behavior control operation is performed. Here, in the straddle-type vehicle, a center of gravity of the rider himself/herself is significantly shifted during turning travel. In addition, during the turning travel, due to generation of a cornering force, a tire possibly slips even with a slight change in a state amount that relates to a speed. Accordingly, in the case where the straddle-type vehicle turns while the automatic deceleration or the automatic acceleration, which causes the above change, occurs, it may be difficult for the rider to handle a thus-generated change in the behavior of the straddle-type vehicle.

The present invention has been made with the above-described problem as the background and therefore obtains a controller and a control method capable of appropriately assisting with driving by a rider.

Solution to Problem

A controller according to the present invention is a controller controlling behavior of a straddle-type vehicle, and includes: an acquisition section that acquires trigger information during travel of the straddle-type vehicle; and an execution section that initiates a control mode according to the trigger information, in the control mode, behavior control operation to make the straddle-type vehicle automatically decelerate or automatically accelerate being performed. The acquisition section further acquires lateral acceleration information of the traveling straddle-type vehicle. In the control mode, the execution section changes the behavior control operation according to the lateral acceleration information, which is acquired by the acquisition section.

A control method according to the present invention is a control method for controlling behavior of a straddle-type vehicle, and includes: an acquisition step in which an acquisition section of a controller acquires trigger information during travel of the straddle-type vehicle; and an execution step in which an execution section of the controller initiates a control mode according to the trigger information, in the control mode, behavior control operation to make the straddle-type vehicle automatically decelerate or automatically accelerate being performed. In the acquisition step, the acquisition section further acquires lateral acceleration information of the traveling straddle-type vehicle. In the execution step, in the control mode, the execution section changes the behavior control operation according to the lateral acceleration information, which is acquired by the acquisition section.

Advantageous Effects of Invention

In the controller and the control method according to the present invention, the acquisition section acquires the lateral acceleration information of the traveling straddle-type vehicle, and in the control mode in which the behavior control operation to make the straddle-type vehicle automatically decelerate or automatically accelerate is performed, the execution section changes the behavior control operation according to the lateral acceleration information. The lateral acceleration information is information that is closely related to a cornering force generated to the straddle-type vehicle during turning travel. Accordingly, with such control, it is possible to make the straddle-type vehicle automatically decelerate or automatically accelerate while a tendency of a change in a grip characteristic of a tire generated to the straddle-type vehicle during the turning travel is considered, and it is thus possible to appropriately assist with driving by the rider.

DETAILED DESCRIPTION

A description will hereinafter be made on a controller and a control method according to the present invention with reference to the drawings.

A description will hereinafter be made on a case where a straddle-type vehicle is a two-wheeled motor vehicle. However, the straddle-type vehicle may be another straddle-type vehicle such as a three-wheeled motor vehicle or a bicycle. The straddle-type vehicle means a vehicle that a rider straddles.

A configuration, operation, and the like, which will be described below, merely constitute one example. The controller and the control method according to the present invention are not limited to a case with such a configuration, such operation, and the like. In the drawings, the same or similar members or portions will be denoted by the same reference sign or will not be denoted by the reference sign. In addition, a detailed structure will appropriately be illustrated in a simplified manner or will not be illustrated. Furthermore, an overlapping description will appropriately be simplified or will not be made.

In the present invention, a term "vehicle body speed" is defined as a concept that includes a speed in the case where the straddle-type vehicle travels forward (that is, a speed as a positive value) and a speed in the case where the straddle-type vehicle travels backward (that is, a speed as a negative value). That is, such expression "an absolute value of the vehicle body speed is increased" means at least one of an increase in the speed in the case where the straddle-type vehicle travels forward and a reduction in the speed in the case where the straddle-type vehicle travels backward. In addition, an expression "the absolute value of the vehicle body speed is reduced" means at least one of the reduction in the speed in the case where the straddle-type vehicle travels forward and the increase in the speed in the case where the straddle-type vehicle travels backward.

In the present invention, a term "a differential value of the vehicle body speed" is defined as a concept that includes acceleration in the case where the vehicle body speed of the straddle-type vehicle is increased (that is, acceleration as a positive value) and acceleration in the case where the vehicle body speed of the straddle-type vehicle is reduced (that is, acceleration as a negative value). That is, an expression "an absolute value of the differential value of the vehicle body speed is increased" means at least one of an increase in the acceleration in the case where the vehicle body speed of the straddle-type vehicle is increased and a reduction in the acceleration in the case where the vehicle body speed of the straddle-type vehicle is reduced. In addition, an expression "the absolute value of the differential value of the vehicle body speed is reduced" means at least one of the reduction in the acceleration in the case where the vehicle body speed of the straddle-type vehicle is increased and the increase in the acceleration in the case where the vehicle body speed of the straddle-type vehicle is reduced.

In the present invention, a term "a second-order differential value of the vehicle body speed" is defined as a concept that includes jerk in the case where the differential value of the vehicle body speed of the straddle-type vehicle is increased (that is, jerk as a positive value) and jerk in the case where the differential value of the vehicle body speed of the straddle-type vehicle is reduced (that is, jerk as a negative value). That is, an expression "an absolute value of the second-order differential value of the vehicle body speed is increased" means at least one of an increase in the jerk in the case where the differential value of the vehicle body speed of the straddle-type vehicle is increased and a reduction in the jerk in the case where the differential value of the vehicle body speed of the straddle-type vehicle is reduced. In addition, an expression "the absolute value of the second-order differential value of the vehicle body speed is reduced" means at least one of the reduction in the jerk in the case where the differential value of the vehicle body speed of the straddle-type vehicle is increased and the increase in the jerk in the case where the differential value of the vehicle body speed of the straddle-type vehicle is reduced.

<Configuration of Behavior Control System>

A description will be made on a configuration of a behavior control system according to an embodiment of the present invention.

Figure 1:
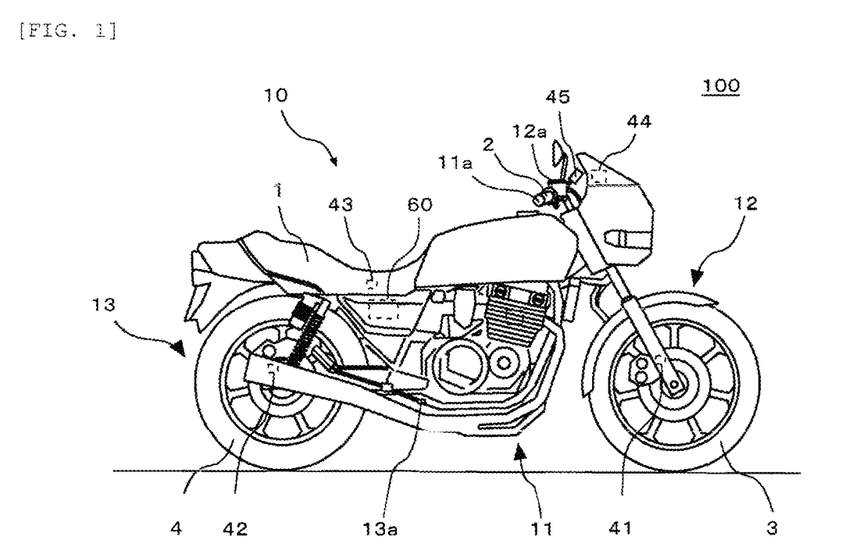
FIG. 1 is a view illustrating an exemplary configuration of a straddle-type vehicle to which a behavior control system according to an embodiment of the present invention is mounted.
Figure 2:
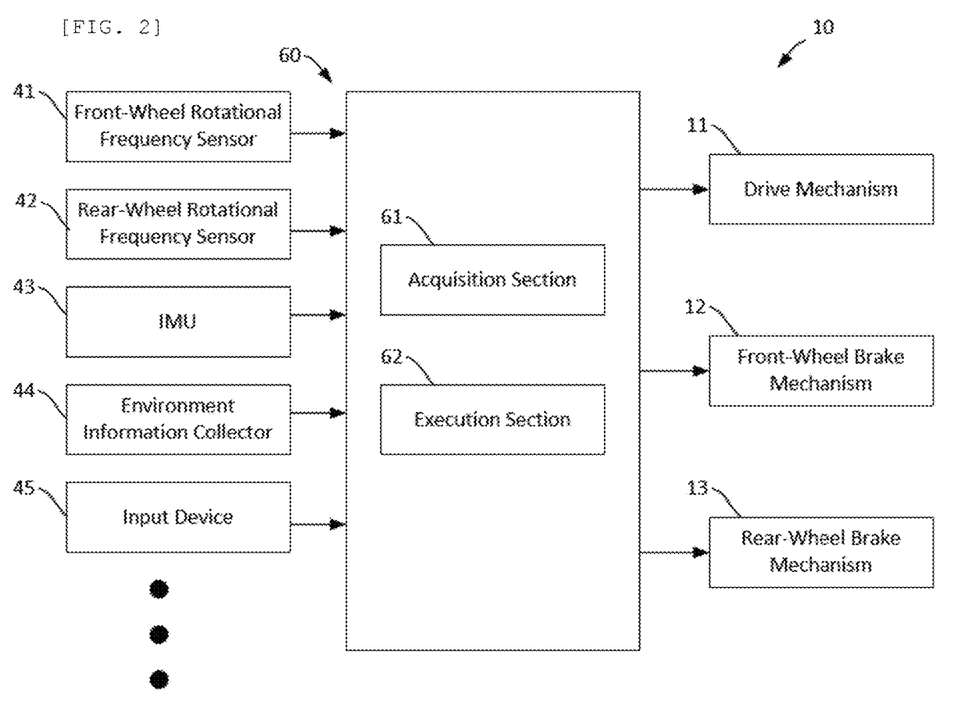
FIG. 2 is a diagram illustrating an exemplary configuration of the behavior control system according to the embodiment of the present invention.

FIG. 1 is a view illustrating an exemplary configuration of the straddle-type vehicle to which the behavior control system according to the embodiment of the present invention is mounted. FIG. 2 is a diagram illustrating an exemplary configuration of the behavior control system according to the embodiment of the present invention.

As illustrated in FIG. 1, a behavior control system 10 is mounted to a straddle-type vehicle 100. The straddle-type vehicle 100 includes: a trunk 1; a handlebar 2 that is held by the trunk 1 in a freely turnable manner; a front wheel 3 that is held by the trunk 1 in a freely turnable manner with the handlebar 2; and a rear wheel 4 that is held by the trunk 1 in a freely rotatable manner.

For example, the behavior control system 10 includes: a drive mechanism 11 for generating a propelling force, which corresponds to at least an operation amount of a drive operation section 11a by the rider, to the rear wheel 4; a front-wheel brake mechanism 12 that brakes the front wheel 3 with a braking force that corresponds to at least an operation amount of a front-wheel brake operation section 12a by the rider; and a rear-wheel brake mechanism 13 that brakes the rear wheel 4 with a braking force that corresponds to at least an operation amount of a rear-wheel brake operation section 13a by the rider.

For example, the drive mechanism 11 may have an engine as a drive source or may have another mechanism such as a motor as the drive source. For example, the drive operation section 11a may be a throttle grip that is provided to the handlebar 2 of the straddle-type vehicle 100 or may be an accelerator pedal that is provided to the trunk 1 of the straddle-type vehicle 100. In addition, the drive mechanism 11 may generate the propelling force, which corresponds to at least the operation amount of the drive operation section 11a by the rider, to the front wheel 3.

For example, the drive mechanism 11 is configured to be able to automatically generate the propelling force and increase or reduce the propelling force in a state where an operation of the drive operation section 11a by the rider is absent. The drive mechanism 11 may be configured to be able to automatically increase or reduce the propelling force in a state where the rider operates the drive operation section 11a and the operation amount thereof is maintained to be constant. That is, the drive mechanism 11 is configured to be able to make the straddle-type vehicle 100 automatically accelerate or automatically decelerate.

The front-wheel brake mechanism 12 and the rear-wheel brake mechanism 13 may be independent from each other. Alternatively, both of the front-wheel brake mechanism 12 and the rear-wheel brake mechanism 13 may generate the braking forces according to the operation amount of one of the front-wheel brake operation section 12a and the rear-wheel brake operation section 13a by the rider. Each of the front-wheel brake operation section 12a and the rear-wheel brake operation section 13a may be a brake lever that is provided to the handlebar 2 of the straddle-type vehicle 100 or may be a brake pedal that is provided to the trunk 1 of the straddle-type vehicle 100, for example. Only one of the front-wheel brake mechanism 12 and the rear-wheel brake mechanism 13 may be provided to the straddle-type vehicle 100.

For example, at least one of the front-wheel brake mechanism 12 and the rear-wheel brake mechanism 13 is configured to be able to automatically generate the braking force and to increase or reduce the braking force in a state where the operation of the front-wheel brake operation section 12a and the rear-wheel brake operation section 13a by the rider is absent. At least one of the front-wheel brake mechanism 12 and the rear-wheel brake mechanism 13 may be configured to be able to automatically increase or reduce a total braking force generated to the straddle-type vehicle 100 in a state where the rider operates at least one of the front-wheel brake operation section 12a and the rear-wheel brake operation section 13a and the operation amount is maintained to be constant. That is, at least one of the front-wheel brake mechanism 12 and the rear-wheel brake mechanism 13 is configured to be able to make the straddle-type vehicle 100 automatically decelerate or automatically accelerate.

As illustrated in FIG. 1 and FIG. 2, the behavior control system 10 includes a front-wheel rotational frequency sensor 41, a rear-wheel rotational frequency sensor 42, an inertial measurement unit (IMU) 43, an environment information collector 44, and an input device 45, for example. The front-wheel rotational frequency sensor 41, the rear-wheel rotational frequency sensor 42, the IMU 43, the environment information collector 44, and the input device 45 can communicate with a controller (ECU) 60. The controller 60 may be provided as one unit or may be divided into multiple units. In addition, the controller 60 may partially or entirely be constructed of a microcomputer, a microprocessor unit, or the like, may be constructed of a member in which firmware or the like can be updated, or may be a program module or the like that is executed by a command from a CPU or the like, for example.

The front-wheel rotational frequency sensor 41 detects rotational frequency information of the front wheel 3, and outputs a detection result. The front-wheel rotational frequency sensor 41 may detect, as the rotational frequency information of the front wheel 3, a rotational frequency itself or may detect another physical quantity that can substantially be converted into the rotational frequency. The rear-wheel rotational frequency sensor 42 detects rotational frequency information of the rear wheel 4, and outputs a detection result. The rear-wheel rotational frequency sensor 42 may detect, as the rotational frequency information of the rear wheel 4, a rotational frequency itself or may detect another physical quantity that can substantially be converted into the rotational frequency.

The IMU 43 includes a three-axis gyroscope sensor and a three-directional acceleration sensor, for example. The IMU 43 is provided to the trunk 1, for example. The IMU 43 at least detects information on lateral acceleration that is generated to the straddle-type vehicle 100, and outputs a detection result. The lateral acceleration is defined as acceleration in a direction that is orthogonal to a vertical axis or a road surface perpendicular axis passing through a center of gravity of the straddle-type vehicle 100 and that is orthogonal to a longitudinal direction or an advancing direction of the straddle-type vehicle 100 or as acceleration in a direction that is orthogonal to a parallel axis with a vehicle height direction passing through the center of gravity of the straddle-type vehicle 100 and that is orthogonal to the longitudinal direction or the advancing direction of the straddle-type vehicle 100. Alternatively, the lateral acceleration may be defined as the acceleration in the direction that is orthogonal to the vertical axis or the road surface perpendicular axis and that is orthogonal to the longitudinal direction or the advancing direction of the straddle-type vehicle 100, and a positional relationship of the acceleration with the center of gravity of the straddle-type vehicle 100 passes through a known point. Further alternatively, the lateral acceleration may be defined as the acceleration in the direction that is orthogonal to the parallel axis with the vehicle height direction and that is orthogonal to the longitudinal direction or the advancing direction of the straddle-type vehicle 100, and the positional relationship of the acceleration with the center of gravity of the straddle-type vehicle 100 passes through a known point. The IMU 43 may detect the lateral acceleration itself as the lateral acceleration information or may detect another physical quantity that can substantially be converted into the lateral acceleration. For example, the IMU 43 may detect, as the lateral acceleration information, another acceleration or a rotational angular velocity from which the lateral acceleration can be derived. That is, any IMU can be adopted as the IMU 43 as long as the IMU can acquire the lateral acceleration information that is defined as information from which the lateral acceleration generated to the straddle-type vehicle 100 can be derived. In addition, the IMU 43 may not be provided in the case where a system other than the behavior control system 10 can acquire the lateral acceleration information.

The environment information collector 44 collects environment information around the straddle-type vehicle 100, and outputs a result. For example, the environment information collector 44 collects positional relationship information of a target with the straddle-type vehicle 100. The target (for example, another vehicle, an object that becomes an obstacle, a person or an animal that becomes the obstacle, a road facility, a road surface defect, or the like) is located in front of, behind, or on a side of the straddle-type vehicle 100, for example. For example, the positional relationship information includes relative distance information, relative speed information, relative acceleration information, and the like. For example, the environment information collector 44 is a distance measurement sensor (for example, a Lidar, a radar, an ultrasonic sensor, or the like), a camera, or the like that is attached to the straddle-type vehicle 100 in a state of facing the front, the rear, or the side thereof. The environment information collector 44 may be a wireless communicator that receives information from the other vehicle or the road facility wirelessly. For example, the wireless communicator receives the positional relationship information of the target that is located in front of, behind, or on the side of the straddle-type vehicle 100, travel state information of the other vehicle that is located in front of, behind, or on the side of the straddle-type vehicle 100, traffic sign information of a road where the straddle-type vehicle 100 travels, traffic condition information of the road where the straddle-type vehicle 100 travels, and the like.

The input device 45 accepts an operation to validate or set a travel mode that is desired by the rider. For example, the input device 45 accepts, as the travel mode, an operation to validate or set adaptive cruise control as one type of cruise control, an operation to validate or set emergency operation for avoidance of a collision, an operation to validate or set haptic motion for warning the rider, or the like. As the input device 45, a lever, a button, a touchscreen, or the like is used, for example. The input device 45 is provided to the handlebar 2, for example.

The cruise control is the travel mode that makes the straddle-type vehicle 100 automatically decelerate or automatically accelerate such that the vehicle body speed of the straddle-type vehicle 100 approximates a speed reference value. Auto-cruise control is the travel mode that makes the straddle-type vehicle 100 automatically decelerate or automatically accelerate such that the vehicle body speed of the straddle-type vehicle 100 is maintained to be lower than the speed reference value by the cruise control and that a distance from the straddle-type vehicle 100 to a preceding vehicle approximates a distance reference value. The speed reference value and the distance reference value can appropriately be set by the rider. The vehicle body speed of the straddle-type vehicle 100 may be acquired on the basis of the rotational frequencies of the front wheel 3 and the rear wheel 4 or may be acquired on the basis of the detection result by the other sensor. That is, any sensor can be adopted as long as a sensor for detecting the vehicle body speed can acquire vehicle body speed information that is defined as information from which the vehicle body speed generated to the straddle-type vehicle 100 can be derived. In addition, such a sensor may not be provided in the case where the system other than the behavior control system 10 can acquire the vehicle body speed information.

The emergency operation for the avoidance of the collision is the travel mode that makes the straddle-type vehicle 100 automatically decelerate or automatically accelerate emergently in the case where a collision possibility of the straddle-type vehicle 100 with the target, which is located in front of, behind, or on the side of the straddle-type vehicle 100, is high. The collision possibility can be acquired on the basis of at least one of the relative distance information, the relative speed information, and the relative acceleration information of the straddle-type vehicle 100 to the target. In addition, a determination reference value of the collision possibility can appropriately be set by the rider. Furthermore, the automatic deceleration or the automatic acceleration may not be deceleration or acceleration with which the collision can reliably be prevented, and suffices as long as the avoidance of the collision by the rider can be assisted thereby.

The haptic motion to inform the rider with the warning is a travel mode that makes the straddle-type vehicle 100 automatically decelerate or automatically accelerate instantaneously. Examples of the warning are: a warning that informs the rider that the emergency operation is performed to avoid the collision; the warning that urges the rider to perform a setting operation of the travel mode; a warning that informs the rider of existence of the other vehicle in a particular travel state; a warning that urges the rider to pay attention to the traffic sign on the road where the straddle-type vehicle 100 travels; a warning that informs the rider of existence of a particular traffic condition (for example, traffic jam, a disabled vehicle, roadwork, or the like); and a warning that informs the rider of a particular state of the straddle-type vehicle 100. The automatic deceleration or the automatic acceleration may occur only once or may be repeated for plural times.

The controller 60 outputs a control command to at least one of the drive mechanism 11, the front-wheel brake mechanism 12, and the rear-wheel brake mechanism 13 so as to control behavior of the straddle-type vehicle 100. The controller 60 includes an acquisition section 61 and an execution section 62.

During travel of the straddle-type vehicle 100, the acquisition section 61 acquires the information that is output from the front-wheel rotational frequency sensor 41, the rear-wheel rotational frequency sensor 42, the IMU 43, the environment information collector 44, and the input device 45, and based on those types of the information, determines whether it is necessary to make the straddle-type vehicle 100 automatically decelerate or automatically accelerate. In the case where it is necessary, the acquisition section 61 outputs, as trigger information, information thereon to the execution section 62. The acquisition section 61 determines such a necessity per validated travel mode. The trigger information is defined as information that serves as a trigger to initiate a control mode in which behavior control operation to make the straddle-type vehicle 100 automatically decelerate or automatically accelerate is performed.

When receiving the trigger information, the execution section 62 initiates the control mode, in which the behavior control operation to make the straddle-type vehicle 100 automatically decelerate or automatically accelerate is performed. When making the straddle-type vehicle 100 automatically decelerate or increasing or reducing the deceleration, the execution section 62 may control the braking force of the straddle-type vehicle 100 (that is, at least one of the front-wheel brake mechanism 12 and the rear-wheel brake mechanism 13), or may control the propelling force of the straddle-type vehicle 100 (that is, the drive mechanism 11). In addition, when making the straddle-type vehicle 100 automatically accelerate or increasing or reducing the acceleration thereof, the execution section 62 may control the propelling force of the straddle-type vehicle 100 (that is, the drive mechanism 11), or may control the braking force of the straddle-type vehicle 100 (that is, at least one of the front-wheel brake mechanism 12 and the rear-wheel brake mechanism 13).

Here, in the control mode, the execution section 62 changes the behavior control operation according to the lateral acceleration information, which is acquired by the acquisition section 61.

As an example, in the control mode, when causing the generation of the automatic deceleration or the automatic acceleration, the execution section 62 changes the second-order differential value of the vehicle body speed, which is generated to the straddle-type vehicle 100, according to the lateral acceleration information, which is acquired by the acquisition section 61. The execution section 62 may execute control of the second-order differential value only at an initiation of the automatic deceleration or the automatic acceleration or, in addition thereto or instead thereof, may execute the control of the second-order differential value during the automatic deceleration or the automatic acceleration. For example, in the behavior control operation that causes the automatic deceleration, in the case where the lateral acceleration information is information indicating that the high lateral acceleration is generated to the straddle-type vehicle 100, the execution section 62 reduces the absolute value of the second-order differential value to be smaller than that in the case where the lateral acceleration information is information indicating that the low lateral acceleration is generated to the straddle-type vehicle 100. For example, in the behavior control operation that causes the automatic acceleration, in the case where the lateral acceleration information is information indicating that the high lateral acceleration is generated to the straddle-type vehicle 100, the execution section 62 reduces the absolute value of the second-order differential value to be smaller than that in the case where the lateral acceleration information is information indicating that the low lateral acceleration is generated to the straddle-type vehicle 100. A degree of a reduction in the absolute value of the second-order differential value may appropriately be set by the rider.

As an example, in the control mode, in the case where the lateral acceleration information, which is acquired by the acquisition section 61, is information indicating that the lateral acceleration exceeding a reference value is generated to the straddle-type vehicle 100, the execution section 62 cancels the behavior control operation. That is, the execution section 62 does not make the straddle-type vehicle 100 automatically decelerate or automatically accelerate. The execution section 62 may cancel the behavior control operation only at the initiation of the automatic deceleration or the automatic acceleration or, in addition thereto or instead thereof, may cancel the behavior control operation during the automatic deceleration or the automatic acceleration. Upon the cancellation, the execution section 62 may continue the control mode in a state where the straddle-type vehicle 100 does not automatically decelerate or automatically accelerate, may cancel the control mode itself, or may control the travel mode itself that requires the automatic deceleration or the automatic acceleration. After canceling the behavior control operation, the execution section 62 may keep canceling the behavior control operation until input of the trigger information is stopped (that is, the acquisition section 61 determines that the automatic deceleration or the automatic acceleration is unnecessary), or may resume the behavior control operation (that is, the automatic deceleration or the automatic acceleration) as long as the acquisition section 61 acquires the lateral acceleration information indicating that the lateral acceleration falling below the reference value is generated to the straddle-type vehicle 100 under a situation where the input of the trigger information continues (that is, the acquisition section 61 keeps determining that the automatic deceleration or the automatic acceleration is necessary). The reference value that is used for the determination on the cancellation of the behavior control operation and the reference value that is used for the determination on the resumption of the behavior control operation thereafter may be the same or may differ from each other. In addition, those reference values may appropriately be set by the rider.

In the control mode, the execution section 62 may further change the behavior control operation according to the vehicle body speed information, which is acquired by the acquisition section 61. For example, only in the case where the vehicle body speed information is information indicating that the vehicle body speed exceeding a reference value is generated to the straddle-type vehicle 100, the execution section 62 may change the behavior control operation according to the lateral acceleration information, which is acquired by the acquisition section 61. In addition, for example, in the case where the vehicle body speed information is information indicating that the high vehicle body speed is generated to the straddle-type vehicle 100, the execution section 62 may increase a change in the absolute value of the second-order differential value, which corresponds to the lateral acceleration information acquired by the acquisition section 61, to be larger than that in the case where the vehicle body speed information is the information indicating that the low vehicle body speed is generated to the straddle-type vehicle 100.

<Operation of Behavior Control System>

A description will be made on operation of the behavior control system according to the embodiment of the present invention.

Figure 3:
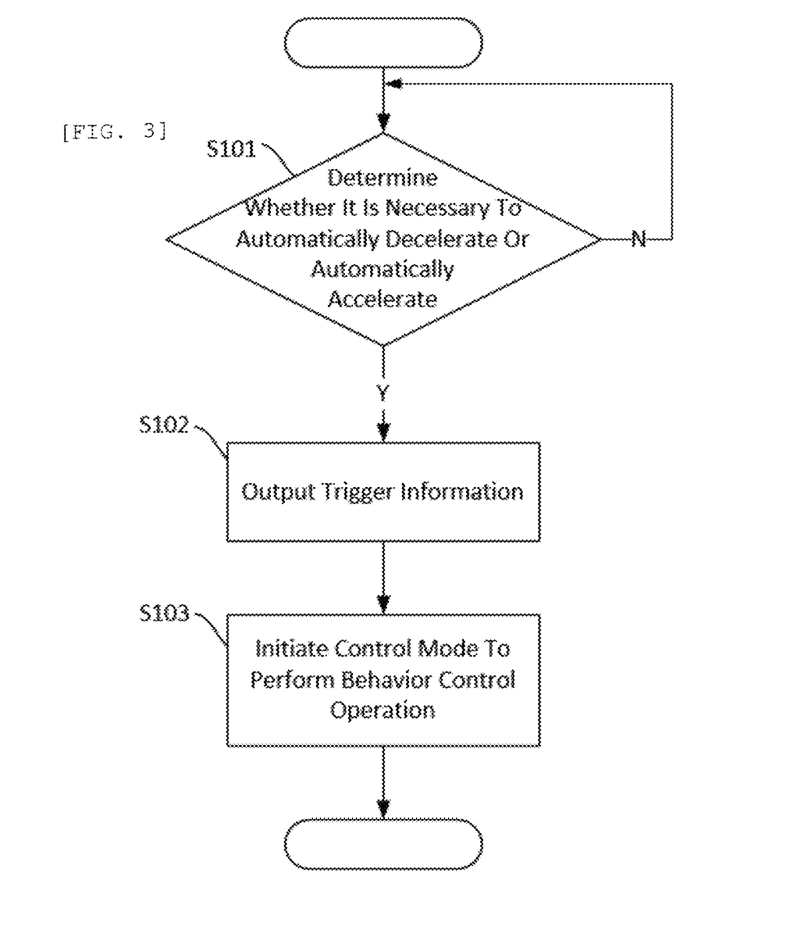
FIG. 3 is a chart illustrating an exemplary processing flow that is executed by a controller in the behavior control system according to the embodiment of the present invention.

FIG. 3 is a chart illustrating an exemplary processing flow that is executed by the controller in the behavior control system according to the embodiment of the present invention.

The controller 60 repeatedly executes the control flow illustrated in FIG. 3 during the travel of the straddle-type vehicle 100.

(Acquisition Step)

In step S101, the acquisition section 61 of the controller 60 determines whether it is necessary to make the straddle-type vehicle 100 automatically decelerate or automatically accelerate. In the case where it is necessary, the processing proceeds to step S102, and the acquisition section 61 outputs, as the trigger information, the information thereon to the execution section 62. If it is not necessary, the processing flow returns to step S101.

(Execution Step)

When the trigger information is output in step S102, in step S103, the execution section 62 of the controller 60 initiates the control mode, in which the behavior control operation to make the straddle-type vehicle 100 automatically decelerate or automatically accelerate is performed. Here, in the control mode, the execution section 62 changes the behavior control operation according to the lateral acceleration information, which is acquired by the acquisition section 61. When the execution section 62 terminates a series of the operation in the control mode, the processing flow returns to step S101.

<Effects of Behavior Control System>

A description will be made on effects of the behavior control system according to the embodiment of the present invention.

In the behavior control system 10, the acquisition section 61 acquires the lateral acceleration information of the traveling straddle-type vehicle 100, and in the control mode in which the behavior control operation to make the straddle-type vehicle 100 automatically decelerate or automatically accelerate is performed, the execution section 62 changes the behavior control operation according to the lateral acceleration information. The lateral acceleration information is information that is closely related to the cornering force generated to the straddle-type vehicle 100 during the turning travel. Accordingly, with such control, it is possible to make the straddle-type vehicle 100 automatically decelerate or automatically accelerate while a tendency of a change in a grip characteristic of the tire generated to the straddle-type vehicle 100 during the turning travel is considered, and it is thus possible to appropriately assist with driving by the rider.

Preferably, in the behavior control system 10, when causing the generation of the automatic deceleration or the automatic acceleration, the execution section 62 changes the second-order differential value of the vehicle body speed, which is generated to the straddle-type vehicle 100, according to the lateral acceleration information, which is acquired by the acquisition section 61. In the case where a significant change in the acceleration, which is not expected by the rider, occurs due to the generation of the automatic deceleration or the automatic acceleration during the turning travel of the straddle-type vehicle 100, it is especially difficult for the rider to handle the thus-generated change in the behavior of the straddle-type vehicle 100. Therefore, with such control, driving by the rider is further appropriately assisted.

Preferably, in the behavior control system 10, during the automatic deceleration or the automatic acceleration, the execution section 62 changes the second-order differential value of the vehicle body speed, which is generated to the straddle-type vehicle 100, according to the lateral acceleration information, which is acquired by the acquisition section 61. In the case where the significant change in the acceleration occurs at the time when the straddle-type vehicle 100 is shifted to the turning travel from the automatic deceleration or the automatic acceleration, it is especially difficult for the rider to handle the thus-generated change in the behavior of the straddle-type vehicle 100. Therefore, with such control, driving by the rider is further appropriately assisted.

In particular, in the case where the behavior control operation is the operation that makes the straddle-type vehicle 100 automatically decelerate, and the lateral acceleration information is the information indicating that the high lateral acceleration is generated to the straddle-type vehicle 100, the execution section 62 preferably reduces the absolute value of the second-order differential value of the vehicle body speed to be smaller than that in the case where the lateral acceleration information is the information indicating that the low lateral acceleration is generated to the straddle-type vehicle 100. In the case where the lateral acceleration information is the information indicating that the high lateral acceleration is generated to the straddle-type vehicle 100, it is possible to assume that a current situation is the situation where the large cornering force is generated to the straddle-type vehicle 100 during the turning travel. In the case where the significant change occurs to the acceleration at the initiation of the automatic deceleration or during the automatic deceleration in such a situation, the tire possibly slips. For this reason, with such control, the significant change in the acceleration is suppressed, and driving by the rider is further appropriately assisted by the automatic deceleration.

In particular, in the case where the behavior control operation is the operation that makes the straddle-type vehicle 100 automatically accelerate, and the lateral acceleration information is the information indicating that the high lateral acceleration is generated to the straddle-type vehicle 100, the execution section 62 preferably reduces the absolute value of the second-order differential value of the vehicle body speed to be smaller than that in the case where the lateral acceleration information is the information indicating that the low lateral acceleration is generated to the straddle-type vehicle 100. In the case where the lateral acceleration information is the information indicating that the high lateral acceleration is generated to the straddle-type vehicle 100, it is possible to assume that a current situation is the situation where the large cornering force is generated to the straddle-type vehicle 100 during the turning travel. In the case where the significant change occurs to the acceleration at the initiation of the automatic acceleration or during the automatic acceleration in such a situation, the tire possibly slips. For this reason, with such control, the significant change in the acceleration is suppressed, and driving by the rider is further appropriately assisted by the automatic acceleration.

Preferably, in the behavior control system 10, in the case where the lateral acceleration information, which is acquired by the acquisition section 61, is the information indicating that the lateral acceleration exceeding the reference value is generated to the straddle-type vehicle 100, the execution section 62 cancels the behavior control operation. With such control, under a situation where the tire is likely to slip, the travel of the straddle-type vehicle 100 that automatically decelerates or automatically accelerates is suppressed. As a result, driving by the rider is further appropriately assisted.

In particular, during the cancellation of the behavior control operation, in the case where the lateral acceleration information, which is acquired by the acquisition section 61, is the information indicating that the lateral acceleration falling below the reference value is generated to the straddle-type vehicle 100, the execution section 62 preferably performs the behavior control operation. With such control, unnecessary restriction of the automatic deceleration or the automatic acceleration is suppressed. As a result, driving by the rider is further appropriately assisted.

Preferably, in the behavior control system 10, the acquisition section 61 acquires the information on the vehicle body speed generated to the traveling straddle-type vehicle 100, and the execution section 62 further changes the behavior control operation according to the vehicle body speed information. With such control, the straddle-type vehicle 100 can automatically decelerate or automatically accelerate while an impact of the slip of the tire is considered. As a result, driving by the rider is further appropriately assisted.

The present invention is not limited to the embodiment that has been described. For example, only a part of the embodiment may be implemented, or parts of the embodiment may be combined. In addition, an order of the steps may be switched, for example.

For example, when the execution section 62 causes the automatic deceleration or the automatic acceleration, in addition to or instead of changing the second-order differential value of the vehicle body speed, which is generated to the straddle-type vehicle 100, according to the lateral acceleration information, which is acquired by the acquisition section 61, at least one of the vehicle body speed and the differential value may be changed according to the lateral acceleration information, which is acquired by the acquisition section 61. The execution section 62 may execute such control only at the initiation of the automatic deceleration or the automatic acceleration or, in addition thereto or instead thereof, may execute the control during the automatic deceleration or the automatic acceleration. For example, in the behavior control operation that causes the automatic deceleration, in the case where the lateral acceleration information is the information indicating that the high lateral acceleration is generated to the straddle-type vehicle 100, the execution section 62 reduces the absolute value of the vehicle body speed or the absolute value of the differential value of the vehicle body speed to be smaller than that in the case where the lateral acceleration information is the information indicating that the low lateral acceleration is generated to the straddle-type vehicle 100. In addition, for example, in the behavior control operation that causes the automatic acceleration, in the case where the lateral acceleration information is the information indicating that the high lateral acceleration is generated to the straddle-type vehicle 100, the execution section 62 reduces the absolute value of the vehicle body speed or the absolute value of the differential value of the vehicle body speed to be smaller than that in the case where the lateral acceleration information is the information indicating that the low lateral acceleration is generated to the straddle-type vehicle 100. The degree of the reduction in the absolute value may appropriately be set by the rider. Furthermore, in the case where the vehicle body speed information is the information indicating that the high vehicle body speed is generated to the straddle-type vehicle 100, the execution section 62 may increase the change in the absolute value to be larger than that in the case where the vehicle body speed information is the information indicating that the low vehicle body speed is generated to the straddle-type vehicle 100.

REFERENCE SIGNS LIST

1: Trunk
2: Handlebar
3: Front wheel
4: Rear wheel
10: Behavior control system
11: Drive mechanism
11a: Drive operation section
12: Front-wheel brake mechanism
12a: Front-wheel brake operation section
13: Rear-wheel brake mechanism
13a: Rear-wheel brake operation section
41: Front-wheel rotational frequency sensor
42: Rear-wheel rotational frequency sensor
43: Inertial measurement unit
44: Environment information collector
45: Input device
60: Controller
61: Acquisition section
62: Execution section
100: Straddle-type vehicle

The invention claimed is:
1. A system for controlling behavior of a straddle-type vehicle (100), the system comprising:

an electronic processor configured to
acquire trigger information during travel of the straddle-type vehicle (100),
initiate a control mode according to the trigger information,
in the control mode, perform a behavior control operation to make the straddle-type vehicle (100) automatically decelerate or automatically accelerate,
acquire lateral acceleration information of the traveling straddle-type vehicle (100),
in the control mode, change the behavior control operation according to the lateral acceleration information,
in the control mode, in response to the lateral acceleration information exceeding a reference value during and/or at initiation of the behavior control operation, cancel the behavior control operation and continue the control mode in a state where the straddle-type vehicle does not perform the behavior control operation, and
in the control mode, at initiation of the automatic deceleration or the automatic acceleration, change a vehicle body speed generated to the straddle-type vehicle (100), a differential value of said vehicle body speed, or a second-order differential value of said vehicle body speed according to the lateral acceleration information acquired by the electronic processor.

2. The system according to claim 1, wherein the behavior control operation is haptic motion to inform a rider of the straddle-type vehicle (100) of a warning and make the straddle-type vehicle (100) automatically decelerate or automatically accelerate.

3. The system according to claim 1, wherein
in the control mode, during the execution of the automatic deceleration or the automatic acceleration, the electronic processor changes a vehicle body speed generated to the straddle-type vehicle (100), a differential value of said vehicle body speed, or a second-order differential value of said vehicle body speed according to the lateral acceleration information acquired by the electronic processor.

4. The system according to claim 1, wherein in the case where the behavior control operation is operation that makes the straddle-type vehicle (100) automatically decelerate, and the lateral acceleration information is information indicating that high lateral acceleration is generated to the straddle-type vehicle (100), the electronic processor reduces an absolute value of the vehicle body speed, an absolute value of the differential value, or an absolute value of the second-order differential value to be smaller than that in the case where the lateral acceleration information is information indicating that low lateral acceleration is generated to the straddle-type vehicle (100).

5. The system according to claim 1, wherein in the case where the behavior control operation is operation that makes the straddle-type vehicle (100) automatically accelerate, and the lateral acceleration information is information indicating that high lateral acceleration is generated to the straddle-type vehicle (100), the electronic processor reduces an absolute value of the vehicle body speed, an absolute value of the differential value, or an absolute value of the second-order differential value to be smaller than that in the case where the lateral acceleration information is information indicating that low lateral acceleration is generated to the straddle-type vehicle (100).

6. The system according to claim 1, wherein the electronic processor changes the vehicle body speed, the differential value, or the second-order differential value by controlling a braking force of the straddle-type vehicle (100).

7. The system according to claim 1, wherein the electronic processor changes the vehicle body speed, the differential value, or the second-order differential value by controlling a propelling force of the straddle-type vehicle (100).

8. The system according to claim 1, wherein the behavior control operation is emergency operation to make the straddle-type vehicle (100) automatically decelerate or automatically accelerate in order to avoid a collision.

9. The system according to claim 1, wherein
during cancellation of the behavior control operation, in the case where the lateral acceleration information is information indicating that the lateral acceleration falling below a reference value is generated to the straddle-type vehicle (100), the electronic processor executes said behavior control operation.

10. The system according to claim 1, wherein
the electronic processor further acquires vehicle body speed information on the traveling straddle-type vehicle (100), and
in the control mode, the electronic processor further changes the behavior control operation according to the vehicle body speed information acquired by the electronic processor.

11. The system according to claim 1, wherein the behavior control operation is operation to make the straddle-type vehicle (100), which currently travels under cruise control, automatically decelerate or automatically accelerate.

12. The system according to claim 11, wherein the cruise control is adaptive cruise control.

13. A control method for controlling behavior of a straddle-type vehicle (100), the control method comprising:
acquiring trigger information during travel of the straddle-type vehicle (100);
initiating a control mode according to the trigger information;
in the control mode, performing a behavior control operation to make the straddle-type vehicle (100) automatically decelerate or automatically accelerate;
acquiring lateral acceleration information of the traveling straddle-type vehicle (100);
in the control mode, changing the behavior control operation according to the lateral acceleration information;
in the control mode, in response to the lateral acceleration information exceeding a reference value during and/or at initiation of the behavior control operation, cancelling the behavior control operation and continue the control mode in a state where the straddle-type vehicle does not perform the behavior control operation, and
in the control mode, at initiation of the automatic deceleration or the automatic acceleration, changing a vehicle body speed generated to the straddle-type vehicle (100), a differential value of said vehicle body speed, or a second-order differential value of said vehicle body speed according to the acquired lateral acceleration information.

* * * * *